United States Patent
Safari Zadeh

(10) Patent No.: US 8,343,295 B2
(45) Date of Patent: Jan. 1, 2013

(54) APPARATUS AND METHOD FOR INSULATING CONDUCTOR BARS FOR ROTATING ELECTRICAL MACHINES

(75) Inventor: Hossein Safari Zadeh, Othmarsingen (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/223,366

(22) Filed: Sep. 1, 2011

(65) Prior Publication Data
US 2012/0048454 A1 Mar. 1, 2012

Related U.S. Application Data

(63) Continuation of application No. PCT/EP2010/052530, filed on Mar. 1, 2010.

(30) Foreign Application Priority Data

Mar. 2, 2009 (CH) ........................................ 305/09

(51) Int. Cl.
*B65H 81/00* (2006.01)
*B32B 37/00* (2006.01)
(52) U.S. Cl. ........ 156/195; 156/185; 156/189; 156/392; 156/428; 156/430
(58) Field of Classification Search .................. 156/392, 156/185, 195, 428, 430, 497, 499, 189
See application file for complete search history.

(56) References Cited

U.S. PATENT DOCUMENTS 3,636,691 A * 1/1972 Bonvallet ....................... 156/431
4,707,214 A * 11/1987 Nithart et al. .................. 156/392

FOREIGN PATENT DOCUMENTS

| DE | 577646 C | 6/1933 |
| DE | 2147446 A | 3/1973 |
| DE | 19830657 A1 | 1/2000 |
| GB | 14961 A | 0/1910 |
| JP | 2000-40420 A * | 2/2000 |

OTHER PUBLICATIONS

Machine translation of JP 2000-40420, date unknown.*

* cited by examiner

*Primary Examiner* — Jeff Aftergut
(74) *Attorney, Agent, or Firm* — Volpe and Koenig, P.C.

(57) ABSTRACT

An apparatus is provided for wrapping a conductor bar with an insulation. The apparatus has at least one supply roll for feeding an insulating tape to the conductor bar. The insulating tape can be wound around the conductor bar by the supply roll rotating relative to the conductor bar. At least one pressure roll is provided, and the insulating tape can be pressed against the conductor bar by means of the pressure roll. A method is also provided for wrapping a conductor bar with insulation, with an insulating tape being pressed against the conductor bar by means of a pressure roll.

11 Claims, 2 Drawing Sheets

APPARATUS AND METHOD FOR INSULATING CONDUCTOR BARS FOR ROTATING ELECTRICAL MACHINES

CROSS REFERENCE TO RELATED APPLICATION

This application is a continuation of International Application No. PCT/EP2010/052530 filed Mar. 1, 2010, which claims priority to Swiss Patent Application No. 00305/09, filed Mar. 2, 2009, the entire contents of all of which are incorporated by reference as if fully set forth.

FIELD OF INVENTION

The invention relates to the field of insulating electrical conductor bars, such as those used in rotating machines, for example in the form of stator coils or Roebel bars. In particular, the invention relates to an apparatus for wrapping a conductor bar with insulation and to a method for wrapping a conductor bar with insulation.

BACKGROUND

It is known for conductor bars to be provided with insulation in order to prevent a short circuit and/or an electrical discharge. One known form of insulating consists of wrapping with an insulating tape containing mica, or a mica tape which is impregnated with an impregnating fluid. When the conductor bar is being wrapped with the insulating tape, the insulating tape is unwound from a supply roll. The insulating tape is fed from the supply roll to the conductor bar. The insulating tape is wound onto the conductor bar by a rotary movement of the conductor bar relative to the supply roll. This wrapping method leads to a non-uniform tape thickness, however, which has to be compensated for retrospectively. In addition, the insulating tape is highly loaded while being applied, in order to increase the winding force and to reduce the tape thickness. The high loading on the insulating tape requires reinforcement of the tape, for example with a glass-fiber support material.

SUMMARY

The present disclosure is directed to an apparatus for wrapping a conductor bar with insulation. The apparatus includes at least a support device having at least one supply roll for holding and feeding an insulating tape to the conductor bar. The conductor bar carrying out a rotational movement and an axial movement, relative to the support device, in order to wrap the conductor bar with the insulating tape. The support device is connected to at least one pressure roll, which presses the insulating tape onto the conductor bar.

In another aspect, the disclosure is directed to a method for wrapping a conductor bar with an insulating tape. The method includes feeding the insulating tape from a supply roll to the conductor bar, with the supply roll and the conductor bar carrying out a relative movement with respect to one another. The method also includes pressing the insulating tape against the conductor bar by a pressure roll.

BRIEF DESCRIPTION OF THE DRAWINGS

The invention will be described in detail in the following text with reference to the drawings, and is illustrated schematically in the drawings, on the basis of one exemplary embodiment.

In the figures shown, in each case schematically, are.

DETAILED DESCRIPTION OF THE PREFERRED EMBODIMENTS

Introduction to the Embodiments

The present invention is based on the object of providing an apparatus for wrapping a conductor bar with an insulating tape, and a method for wrapping a conductor bar with an insulating tape, which allow the insulating tape to be applied to the conductor bar in a better manner, in order to improve the insulation characteristics.

According to the invention, this problem is solved by an apparatus for wrapping a conductor bar with an insulating tape and by a method for wrapping a conductor bar with an insulating tape as set forth in the appended claims.

According to the invention, an apparatus for wrapping a conductor bar with an insulating tape has at least one supply roll, which is arranged on a support device, for holding and feeding an insulating tape to the conductor bar. The conductor bar is wrapped with the insulating tape by a rotary movement of the conductor bar relative to the supply roll, and a superimposed axial relative movement. According to the invention, at least one pressure roll is provided, by means of which the insulating tape can be pressed onto the conductor bar. The use of a pressure roll allows the insulating tape to be compressed onto the conductor bar during the winding process, leading to a uniform tape thickness and fewer cavities. Since the insulating tape is compressed by the pressure roll while being applied to the conductor bar, the tensile load on the insulating tape during the winding process can be reduced. This makes it possible to use thinner insulating tapes than was previously possible.

According to one advantageous embodiment of the invention, pressure which is exerted by the pressure roll at right angles to the surface of the conductor bar can be adjusted by means of an adjustment device. This results in controlled compression of the insulating tape during the wrapping process.

According to a supplementary embodiment, the contact pressure which is applied to the insulated conductor bar can be varied over time, in particular in an oscillating manner. This measure additionally improves the compression.

In one further development of the invention, a plurality of insulating tapes can be fed to the conductor bar at the same time, with a separate pressure roll being provided for each insulating tape. This allows multilayer insulation to be applied to the conductor bar.

In a method according to the present invention, a conductor bar is wrapped with an insulating tape, the insulating tape being fed to the conductor bar by means of a supply roll, which is connected to a support which rotates relative to the conductor bar. The insulating tape is pressed against the conductor bar by means of a pressure roll.

Further advantages and embodiments of the invention will become evident from the following description and the attached drawings.

DETAILED DESCRIPTION

Figure 1:
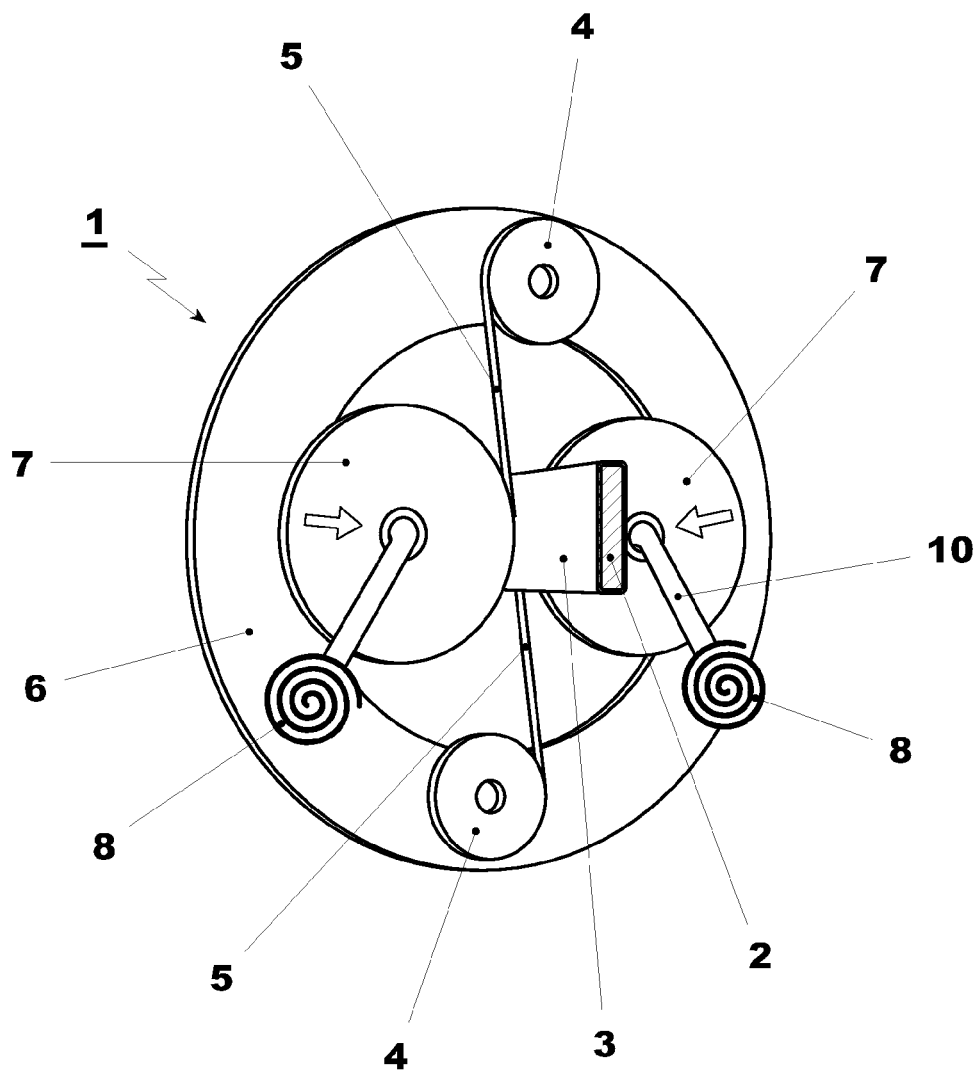
FIG. 1, which is an apparatus according to a first preferred embodiment of the invention, FIG. 2, which is an apparatus according to a second preferred embodiment of the invention.
Figure 2:
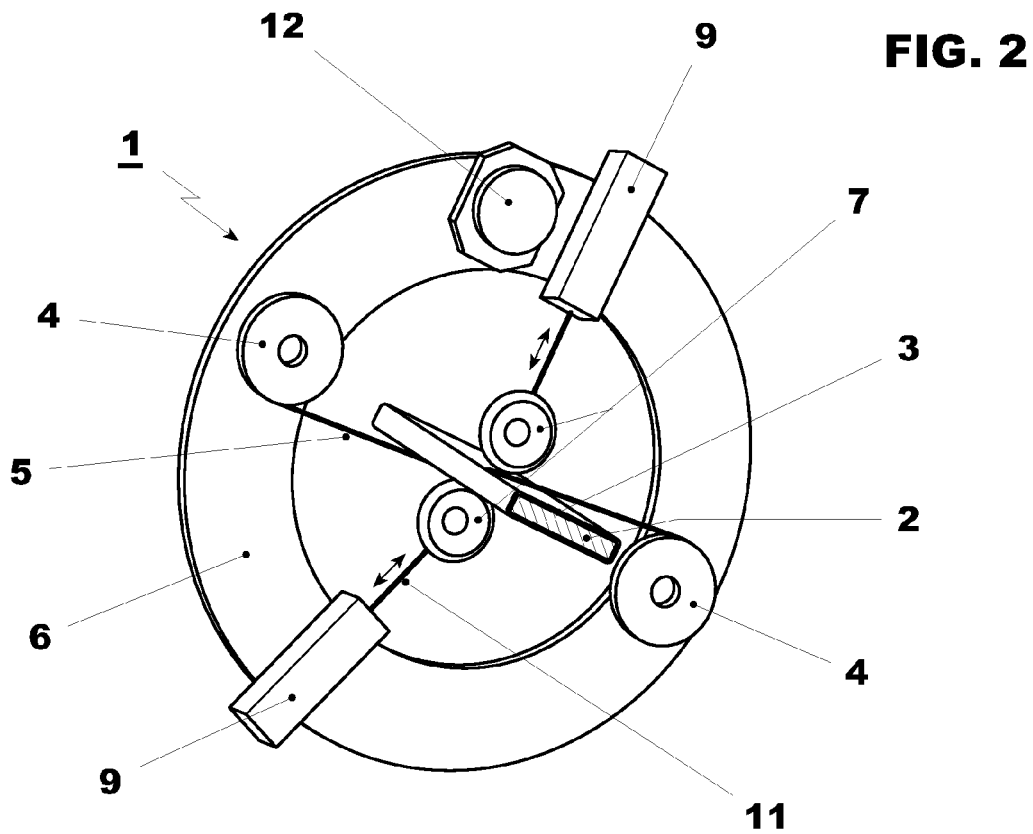

FIG. 1 illustrates an apparatus 1 for application of insulation 3 to a conductor bar 2 by winding an insulating tape 2 onto, according to a first preferred embodiment of the invention. The conductor bar 2 is used in rotating machines, for example in the form of stator bars or Roebel bars, and is comprised of a conductor or a bundle of conductors. The apparatus 1 has at least one supply roll 4 for holding and feeding an insulating tape 5 to the conductor bar 2. The conductor bar 2 is wrapped with the insulating tape 5 by a rotational movement of the conductor bar 2 with respect to the supply roll 4. For this purpose, the supply roll 4 can be connected to a support device 6, which rotates around the conductor bar 2. Alternatively, the position of the support device 6 may also be fixed, with the conductor bar 2 being mounted such that it can rotate. A relative axial movement between the support device 6 and the conductor bar 2 allows the insulating tape 5 to be applied over the length of the conductor bar 2. According to the invention, at least one pressure roll 7 is provided. The pressure roll 7 is arranged and designed such that it presses the insulating tape 5 onto the conductor bar 2. In one advantageous embodiment of the invention, the apparatus 1 has two opposite pressure rolls 7, as can be seen in FIGS. 1 and 2. In this case, the pressure rolls 7 each press an insulating tape 5 against the conductor bar 2, in order to compress the insulating tape 5. It is also feasible for two opposite pressure rolls 7 to press one individual insulating tape 5 against the conductor bar 2. The pressure roll or pressure rolls 7 are connected by means of a pivoting arm 10 to the support device 6, such that they can move at right angles to the surface of the conductor bar 2. In order to ensure both the required pivoting freedom and an appropriate contact-pressure force of the pressure roll 7, an adjustment device 8, 9 is provided on the support device 6. In the embodiment form shown in FIG. 1, the adjustment device 8 is operated electrically. The pressure roll 7 is arranged at the opposite end of the arm 10, with the arm 10 being connected to the support device 6 by means of the electrical adjustment device 8, such that it can pivot. The pivoting movement of the arm 10 allows the pressure roll 7 to move at right angles to the surface of the conductor bar 2. In FIG. 2, a pneumatic adjustment device 9 is provided in order to guide the pressure roll 7 along the surface of the conductor bar 2. The adjustment device 9 shown in FIG. 2 comprises a pneumatic cylinder 13 with a piston rod 11, on whose outer end the pressure roll 7 is arranged. The adjustment device 9 is once again connected to the support device 6. During a relative rotational movement of the pressure roll 7 around the conductor bar 2, the pressure roll 7 is moved by means of the adjustment device 9 in the radial direction relative to the longitudinal axis of the conductor bar 2. An air pump 12 and a compensator for the adjustment device 9 can likewise be provided on the support device 6.

The contact pressure of the pressure roll 7 on the insulation 3 on the conductor bar 2 can be adjusted by means of the adjustment device 8, 9. The insulating tape 5 can therefore be pressed on not only with a constant contact pressure but also to a greater or lesser extent, in accordance with the requirements, during the winding process. Furthermore, it has been found to be advantageous for the adjustment device 8, 9 to be equipped with means for oscillating variation of the contact pressure. The frequency of the applied oscillations is in this case advantageously in a range between 5 Hz and 50 Hz, specifically in a range between 5 Hz and 10 Hz.

The pressure roll 7 can be produced completely or partially from an elastic material, for example soft rubber. The external circumference may be in the form of a pneumatic tire. The hardness of the rubber, or the air pressure in the tire, are chosen depending on the required contact pressure.

Figure 3:
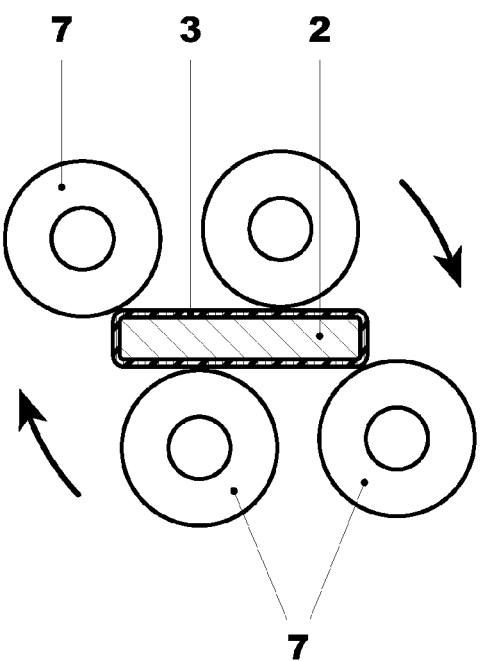
FIG. 3, which is an apparatus according to a third preferred embodiment of the invention.

FIGS. 1 and 2 show embodiment forms which each have two supply rolls 4 and two pressure rolls 7. However, it is also possible for the apparatus 1 to be equipped with a greater or lesser number of pressure rolls 7. Four pressure rolls 7, as illustrated in FIG. 3, allow the conductor bar 2 to be wrapped with four insulating tapes 5 at the same time, in order to speed up the insulating process.

The use of at least one pressure roll 7 allows the insulating tape 5 to be compressed at the same time while being applied to the conductor bar 2, thus leading to a uniform tape thickness and few cavities. Since the insulating tape 5 is compressed by the pressure roll 7 while being applied to the conductor bar 2, the tensile load on the insulating tape 5 can be reduced during the winding process. This makes it possible to use thin insulating tapes 5. This results in the capability to use an insulating tape 5 with only a small glass fiber proportion, or with very thin glass fibers as a support material. Since an insulating tape 5 which is applied by means of the apparatus according to the invention is compressed, it has a low resin content after impregnation, thus leading to a higher withstand voltage and to lower losses.

LIST OF REFERENCE SYMBOLS

1. Apparatus
2. Conductor bar
3. Insulation
4. Supply roll
5. Insulating tape
6. Support device
7. Pressure roll
8. Adjustment device
9. Adjustment device
10. Arm
11. Rod
12. Air pump

What is claimed is:

1. A method for wrapping a conductor bar with an insulating tape, the method comprising:
    feeding the insulating tape from a supply roll to the conductor bar, with the supply roll and the conductor bar carrying out a relative movement with respect to one another; and
    pressing the insulating tape against the conductor bar by a pressure roll, wherein a contact pressure exerted by the pressure roll on the insulating tape on the conductor bar can be varied over time, the contact pressure which is exerted by the pressure roll on the insulating tape on the conductor bar oscillates at a frequency in the range from 5 Hz to 50 Hz.

2. The method as claimed in claim 1, wherein a position of the pressure roll relative to the support device is adjustable.

3. A method for wrapping a conductor bar with an insulating tape, the method comprising:
    feeding the insulating tape from a supply roll to the conductor bar, with the supply roll and the conductor bar carrying out a relative movement with respect to one another; and
    pressing the insulating tape against the conductor bar by a pressure roll, wherein a contact pressure exerted by the pressure roll on the insulating tape on the conductor bar can be varied over time, the contact pressure which is exerted by the pressure roll on the insulating tape on the conductor bar oscillates at a frequency in the range from 5 Hz to 10 Hz.

4. An apparatus for wrapping a conductor bar with insulation, comprising at least a support device having at least one supply roll for holding and feeding an insulating tape to the conductor bar, with the conductor bar carrying out a rotational movement and an axial movement relative to the support device, in order to wrap the conductor bar with the insulating tape, the support device is connected to at least one pressure roll, which presses the insulating tape onto the conductor bar wherein a contact pressure exerted by the at least one pressure roll on the conductor bar can be adjusted by an adjustment device, the adjustment device is configured to temporally vary an oscillating application of the contact pressure and wherein a frequency of the oscillating contact pressure is in the range from 5 Hz to 50 Hz.

5. The apparatus as claimed in claim 4, wherein the support device surrounds the conductor bar in the form of a ring, and can rotate relative to it.

6. The apparatus as claimed in claim 5, wherein the at least one pressure roll is attached to an arm which is connected to the support device, such that it can move, by an adjustment device.

7. The apparatus as claimed in claim 4, wherein the at least one pressure roll is made completely or partially from rubber, or has a fluid-filled tire on an external circumference thereof.

8. The apparatus as claimed in claim 6, wherein the at least one adjustment device on the support device is driven electrically or pneumatically.

9. The apparatus as claimed in claim 4, wherein two or four supply rolls are provided, which each hold an insulating tape and feed it to the conductor bar, with a contacting pressure roll being provided for each insulating tape.

10. The apparatus as claimed in claim 4, wherein the insulating tape is free of reinforcing fibers.

11. An apparatus for wrapping a conductor bar with insulation, comprising at least a support device having at least one supply roll for holding and feeding an insulating tape to the conductor bar, with the conductor bar carrying out a rotational movement and an axial movement relative to the support device, in order to wrap the conductor bar with the insulating tape, the support device is connected to at least one pressure roll, which presses the insulating tape onto the conductor bar wherein a contact pressure exerted by the at least one pressure roll on the conductor bar can be adjusted by an adjustment device, the adjustment device is configured to temporally vary an oscillating application of the contact pressure and wherein a frequency of the oscillating contact pressure is in the range from 5 Hz to 10 Hz.

* * * * *